3,432,601
CONTROL OF POWDERY MILDEW WITH NITRONAPHTHONITRILES

Itsuki Okuda, Shimizu, Eiichi Yoshinaga, Ogasa-gun, and Takeo Tsuboi and Masaru Kado, Shimizu, Japan, assignors to Kumiai Chemical Industry Co., Ltd., Tokyo, Japan
No Drawing. Filed May 23, 1967, Ser. No. 640,473
Claims priority, application Japan, July 28, 1966, 41/49,071
U.S. Cl. 424—304    8 Claims
Int. Cl. A01n 9/20; C07c 121/62

ABSTRACT OF THE DISCLOSURE

A fungicidal and bactericidal composition comprising as an active ingredient nitronaphthonitrile, in the presence of an inert diluent.

---

The present invention relates to fungicidal and bactericidal compositions containing nitronaphthonitrile as the active ingredients and their use in the control of fungicidal and bacterial diseases of plants.

Powdery mildew gives a large damage to cucumber, melon, oriental melon, and the like cultivated in a green house and the damage is especially serious as the temperature rises in spring, furthermore the harmful fungi give a considerable damage to cucumber and oriental melon cultivated in autumn.

However, known fungicides are not effective enough to prevent the powdery mildew, or is apt to cause phytotoxicity on host plants.

For example, sulfur or sulfide composition is effective to powdery mildew, but lime sulfur stains fruits and moreover wettable sulfur is apt to cause phytotoxicity on melon and oriental melon, so that those compositions can not be used. Accordingly, 2-(1-methylheptyl)-4,6-dinitrophenylcrotonate (trade name: Karathane) has been hitherto used but there is such a disadvantage that when the temperature is high, it is apt to cause phytotoxicity, so that the spray at a high temperature in daytime must be avoided in a greenhouse.

The compositions of the present invention have excellent protective and curative activities to powdery mildew of fruits and vegetables without phytotoxicity and shows an excellent preventing effect by spreading on plants anticipated development of powdery mildew or on plants already infected with powdery mildew. As to the curative activity, the compositions according to present invention show more rapid activity than Karathane which is known to have excellent curative effects.

For use of the present invention, nitronaphthonitrile is diluted with carrier to formulate dust, wettable powder or emulsifiable concentrate, if desired, suitable surfactants are incorporated, which is directly sprayed on plants or applied after diluting it to suitable concentration.

The term "carrier" herein means a carrying agent used for transferring said compound to desired areas, which may be solid or liquid. For example, as the solid carrier, mention may be made of various clays, pyrophillite, talc, diatomaceous earth, silica, etc. As the liquid carrier, use may be made of a solvent for the compound of the present invention, such as, benzene, xylene, cyclohexanone, the other hydrocarbons, etc. and liquids which can disperse or dissolve the compound of the present invention by means of additives, even if it is not solvent, for example, water. Such surfactants include nonionic types, such as polyoxyethylene alkylaryl ether, polyoxyethylene sorbitan monolaurate, cationic types, such as alkyl dimethylbenzyl ammonium chloride, alkyl pyridium halide, and anionic types, such as alkyl benzenesulphonate, lignin sulphonate, and cation-anionic types, such as laurylamine derivatives, alkyldimethylbetaine, dodecylaminoethylglycine, and the like.

Of course, it is preferable to ensure the activity by mixing with additives used in conventional pesticides, such as spreader, emulsifier, wetting agent, adhesive and the like. It is also possible to give various effects by mixing with the other fungicides such as "Dithane," "Dyrene" and "Orthocide," with insecticides such as "Malathon," "Basudin" and the like.

As the typical compounds used in the present invention, mention may be made of 3-nitro-1-naphthonitrile, M.P. 117 to 118° C.
4-nitro-1-naphthonitrile M.P. 133° C.
5-nitro-1-naphthonitrile M.P. 197° C.
8-nitro-1-naphthonitrile M.P. 138° C.
1-nitro-2-naphthonitrile M.P. 138° C.
5-nitro-2-naphthonitrile M.P. 172 to 173° C.
8-nitro-2-naphthonitrile M.P. 143° C.

The nitronaphthonitriles are prepared by nitrating naphthonitrile, cyanizing halogenated nitronaphthalene and diazotizing and cyanizing amino-nitronaphthalene.

The specific manner in which the compounds of the present invention can be prepared, is illustrated in the following examples:

EXAMPLE 1

Preparation of 5-nitro-1-naphthonitrile 31.5 grams (0.5 mole) of fuming nitric acid were added with stirring to 15.3 grams (0.1 mole) of cyanonaphthalene at a temperature less than 15° C. After addition, the reaction mixture was stirred for more than one hour at a temperature less than 30° C. to complete the reaction, further held at room temperature for some time. The reaction mixture was poured into ice water, with vigorous stirring and then the formed precipitate was washed with water by decantation, was filtered and the residue was washed with 300 ml. of water, and dried. Fifteen point six grams of yellow fine powder of 5-nitro-1-naphthonitrile (M.P. 197° C.) were obtained from recrystallization of ethanol.

The invention will be explained in more details with reference to the following examples, but it should be noted that it is possible to modify additives, the blend ratio and active ingredients in a wide range.

EXAMPLE 2

Dust

Four percent by weight of 5-nitro-1-naphthonitrile, 6% by weight of diatomaceous earth, 50% by weight of talc and 40% by weight of kaoline are mixed and pulverized, and the resulting dust is used by a duster.

EXAMPLE 3

Wettable powder

Twenty percent by weight of 5-nitro-1-naphthonitrile, 60% by weight of diatomaceous earth, 15% by weight of kaolin and 5% by weight of mixture of polyoxyethylene alkyl phenyl ether, polyoxyethylenephenyl phenol ether and polyoxyethylenecarboxylic ester, as wetting agent, are mixed and pulverized, and the resulting mixture is sprayed as wettable powder which is used by diluting with water.

The following example demonstrates the utility of nitronaphthonitriles of the present invention.

EXPERIMENTAL EXAMPLE 1

A test for prevention of powdery mildew

One test group has three plants of cucumber (species: Sagami Hanjiro, 10–12 main leaf stage) cultivated in a greenhouse and the first dispersion of the fungicide was affected at the original period of infection with powdery mildew and after 8 days the second dispersion was affected, wherein the dispersions are affected fully on the both sides of the leaves by means of a sprayer. Ten days after the second dispersion, the infection ratio was checked with respect to main leaves of one group consisting of the three plants (average 16–17 leaves in one plant) and the damage degree was determined according to the following equation.

Damage degree:

$$\frac{\Sigma \text{ (grade valve} \times \text{number of leaves infected)}}{10 \times \text{total number of leaves checked}}$$

The grade value was determined based on the following table.

| Grade value: | Ratio of area infected (percent) |
|---|---|
| 0 | 0 |
| 0.5 | 1–10 |
| 2.0 | 11–30 |
| 5.0 | 31–70 |
| 8.5 | 71–100 |
| 10.0 | Killed |

The compositions to be tested were sprayed by diluting wettable powder of 20% of active ingredient with water and as comparative composition, use was made of wettable poder of "Dimandithane" as active ingredient comprising manganese ethylenebisdithiocarbamate. In the dispersion liquid was added 3,000 times of "Ihara Kumiten" as a spreader of active ingredient comprising a mixture of alkylaryl glycol ether and sodium dinaphthyl sulphonate.

| Active ingredient | Concentration (p.p.m.) | Damage degree | Phytotoxicity |
|---|---|---|---|
| 3-nitro-1-naphthonitrile | 500 | 0.9 | No |
| 4-nitro-1-naphthonitrile | 500 | 1.6 | No |
| 5-nitro 1-naphthonitrile | 500 | 0.3 | No |
| 8-nitro-1-naphthonitrile | 500 | 3.7 | No |
| 1-nitro-2-naphthonitrile | 500 | 1.9 | No |
| 5-nitro-2-naphthonitrile | 500 | 2.6 | No |
| 8-nitro-2-naphthonitrile | 500 | 2.7 | No |
| Manganese ethylenebis-dithio-carbamate (comparative) | 1,166 | 3.7 | No |
| Non-sprayed | 0 | 49.1 | No |

What we claim is:

1. A method for controlling powdery mildew on a plant comprising applying to the plant to be protected a powdery mildrew controlling amount of a nitronaphthonitrile selected from the group consisting of 3-nitro-1-naphthonitrile, 4-nitro-1-naphthonitrile, 5-nitro-1-naphthonitrile, 8 - nitro-1-naphthonitrile, 1-nitro-2-naphthonitrile, 5-nitro-2-naphthonitrile and 8-nitro-2-naphthonitrile and an inert diluent.

2. A method according to claim 1 wherein the nitronaphthonitrile is 4-nitro-1-naphthonitrile.

3. A method according to claim 1 wherein the nirtonaphthonitrile is 5-nitro-1-naphthonitrile.

4. A method according to claim 1 wherein the nitronaphthonitrile is 8-nitro-1-naphthonitrile.

5. A method according to claim 1 wherein the nitronaphthonitrile is 1-nitro-2-naphthonitrile.

6. A method according to claim 1 wherein the nitronaphthonitrile is 5-nitro-2-naphthonitrile.

7. A method according to claim 1 wherein the nitronaphthonitrile is 3-nitro-1-naphthonitrile.

8. A method according to claim 1 wherein the nitronaphthonitrile is 8-nitro-2-naphthonitrile.

References Cited

Chem. Abst,, 63: 555, 8a (1965).
Chem. Abst., vol. 31–40, Decennial Index, Subj. J-Proteoses, page 7413 (Oct. 21, 1949).

ALBERT T. MEYERS, Primary Examiner.

S. J. FRIEDMAN, Assistant Examiner.

U.S. Cl. X.R.

260—465